(12) United States Patent
Alarcon

(10) Patent No.: US 9,854,846 B2
(45) Date of Patent: Jan. 2, 2018

(54) PACKAGING FOR ELECTRONIC SMOKING DEVICE

(71) Applicant: LOEC, Inc., Greensboro, NC (US)

(72) Inventor: Ramon Alarcon, Los Gatos, CA (US)

(73) Assignee: Fontem Holdings 4 B.V., Amsterdam (NL)

( * ) Notice: Subject to any disclaimer, the term of this patent is extended or adjusted under 35 U.S.C. 154(b) by 358 days.

(21) Appl. No.: 14/537,662

(22) Filed: Nov. 10, 2014

(65) Prior Publication Data

US 2015/0128975 A1    May 14, 2015

Related U.S. Application Data

(60) Provisional application No. 61/901,941, filed on Nov. 8, 2013.

(51) Int. Cl.
*A24F 47/00* (2006.01)
*H02J 7/00* (2006.01)

(52) U.S. Cl.
CPC .......... *A24F 47/008* (2013.01); *H02J 7/0044* (2013.01); *H02J 7/0047* (2013.01)

(58) Field of Classification Search
CPC .................................................. A24F 47/008
USPC ......................................... 340/527; 362/276
See application file for complete search history.

(56) References Cited

U.S. PATENT DOCUMENTS

| 6,664,000 B1* | 12/2003 | Sonobe | H01M 2/34 429/100 |
|---|---|---|---|
| 2011/0036346 A1* | 2/2011 | Cohen | A61M 15/0065 128/200.14 |
| 2013/0228190 A1* | 9/2013 | Weiss | A24F 47/002 131/328 |
| 2013/0255702 A1* | 10/2013 | Griffith, Jr. | A24F 47/008 131/328 |
| 2013/0341218 A1* | 12/2013 | Liu | A24F 15/18 206/242 |
| 2014/0097103 A1* | 4/2014 | Cameron | A24F 47/008 206/38 |
| 2014/0230835 A1* | 8/2014 | Saliman | A24F 47/008 131/329 |
| 2014/0366894 A1* | 12/2014 | Liu | A24F 47/008 131/328 |
| 2015/0047661 A1* | 2/2015 | Blackley | H05B 3/12 131/329 |
| 2015/0164139 A1* | 6/2015 | Marchitto | B65D 85/1045 206/268 |

* cited by examiner

*Primary Examiner* — Eric Yaary
(74) *Attorney, Agent, or Firm* — Dykema Gossett PLLC

(57) ABSTRACT

Packaging for an electronic smoking device includes a cut-out portion that allows light emitted by an LED on the device to shine outside the package. The LED can be configured to blink or emit patterned light during a retail mode, but not during a shipping mode or normal operation mode.

24 Claims, 6 Drawing Sheets

PACKAGING FOR ELECTRONIC SMOKING DEVICE

FIELD OF THE DISCLOSURE

The present disclosure relates to a system, a method, and an apparatus for packaging electronic smoking articles, and more particularly for packaging electronic cigarettes and electronic cigarette packs.

BACKGROUND OF THE DISCLOSURE

Electronic cigarettes, also known as e-cigarettes (eCigs) and personal vaporizers (PVs), are a popular alternative to traditional tobacco-based cigarettes that must be burned in order to generate smoke for inhalation. Electronic cigarettes provide a vapor for inhalation, but do not contain certain byproducts of combustion that may be harmful to human health. Electronic cigarettes are electronic inhalers that vaporize or atomize a liquid solution (smoke juice) into an aerosol mist that may then be delivered to a user. A typical eCig has two main parts—a housing holding a battery and a cartomizer. The housing holding the battery typically includes a rechargeable lithium-ion (Li-ion) battery, a light emitting diode (LED), and a pressure sensor. The cartomizer typically includes a liquid solution, an atomizer and a mouthpiece. The atomizer typically includes a heating coil that vaporizes the liquid solution.

SUMMARY OF THE DISCLOSURE

Packaging for an electronic smoking device includes a cut-out portion that allows light emitted by an LED on the device to shine outside the package. The LED can be configured to blink or emit patterned light during a retail mode, but not during a shipping mode or normal operation mode.

In an embodiment, an electronic smoking article comprises a cartomizer configured to aerosolize a solution and deliver the aerosolized solution to a user; a battery configured to power the cartomizer; a light source configured to emit light from the electronic smoking article; and a microcontroller unit coupled to the light source, the microcontroller unit configured to control emission of light from the light source; wherein the microcontroller unit further comprises a timer configured to measure an amount of time that has passed since a date of manufacture of the electronic smoking article.

In another embodiment, a retail system for an electronic smoking article comprises the electronic smoking article comprising at least one of an electronic cigarette or a charging pack for the electronic cigarette, the electronic smoking article further comprising i) a light source configured to emit light from the electronic smoking article, and ii) a microcontroller unit coupled to the light source, the microcontroller unit configured to control emission of light from the light source; and a package for the electronic smoking article, the package comprising a cut-out portion configured permit the light emitted from the light source to shine through the package when the electronic smoking article is enclosed within the package.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
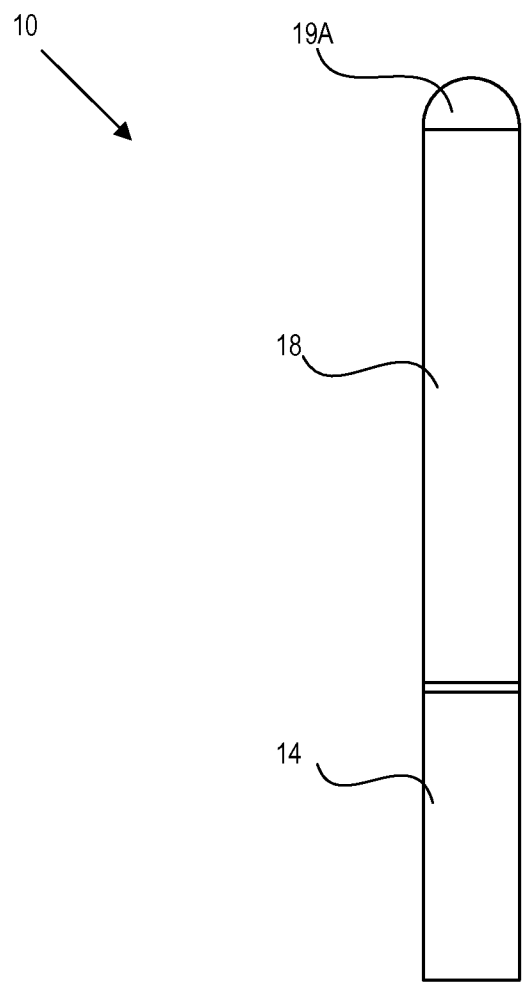
FIG. 1 is an isometric view depicting an example of an eCig that is constructed according to an aspect of the disclosure.

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows an example of an eCig 10 according to an aspect of the disclosure. The eCig 10 comprises a cartridge 14 and an eCig body 18. In an alternative embodiment, the cartridge 14 and the eCig body 18 can be combined into a single unit. The cartridge 14 comprises an opening (not shown) through which aerosol may be delivered to a user. The cartridge 14 comprises a solution (not shown) and an atomizer (not shown). The solution may include, e.g., a liquid, a gel, a solid, or a gas that comprises molecules (or particles) to be delivered in an aerosol to a user. The eCig body 18 includes a power supply (e.g., a rechargeable Li-ion battery) (not shown) and a light source (e.g., LED), such as LED 19A shown in FIG. 1. The LED 19A may emit light when a user inhales aerosol from the opening of the cartridge 14 or when a microcontroller unit (MCU) (not shown) within the body 18 of the eCig signals the LED 19A to emit light. In an example, the LED 19A may emit colored light, such as blue light, for example.

Figure 2:
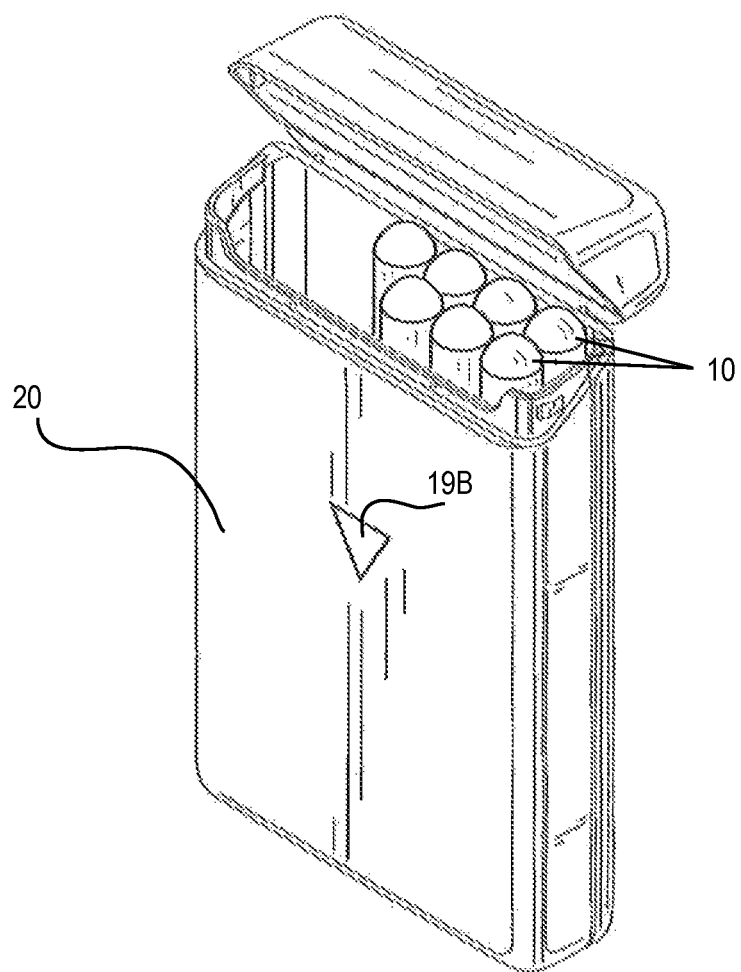
FIG. 2 is an isometric view depicting an example of an eCig charging pack that is constructed according to an aspect of the disclosure.

FIG. 2 shows an example of an eCig charging pack 20. The pack 20 comprises a plurality of regions, each of which is configured to receive a respective eCig 10, or a component of the eCig 10 (e.g., cartridge 14 and/or eCig body 18). The pack 20 comprises a charging device that connects to and supplies a power source to charge the power supply (e.g., Li-ion battery) in the eCig 10, or a component of the eCig 10 (e.g., cartridge 14 and/or eCig body 18). The pack may include an LED 19B embedded on front outer surface. The LED 19B may be triangular in shape and may emit colored light, such as blue light, for example. The LED 19 may emit light when signaled to do so by an MCU (not shown) associated with the pack 20.

Figure 3:
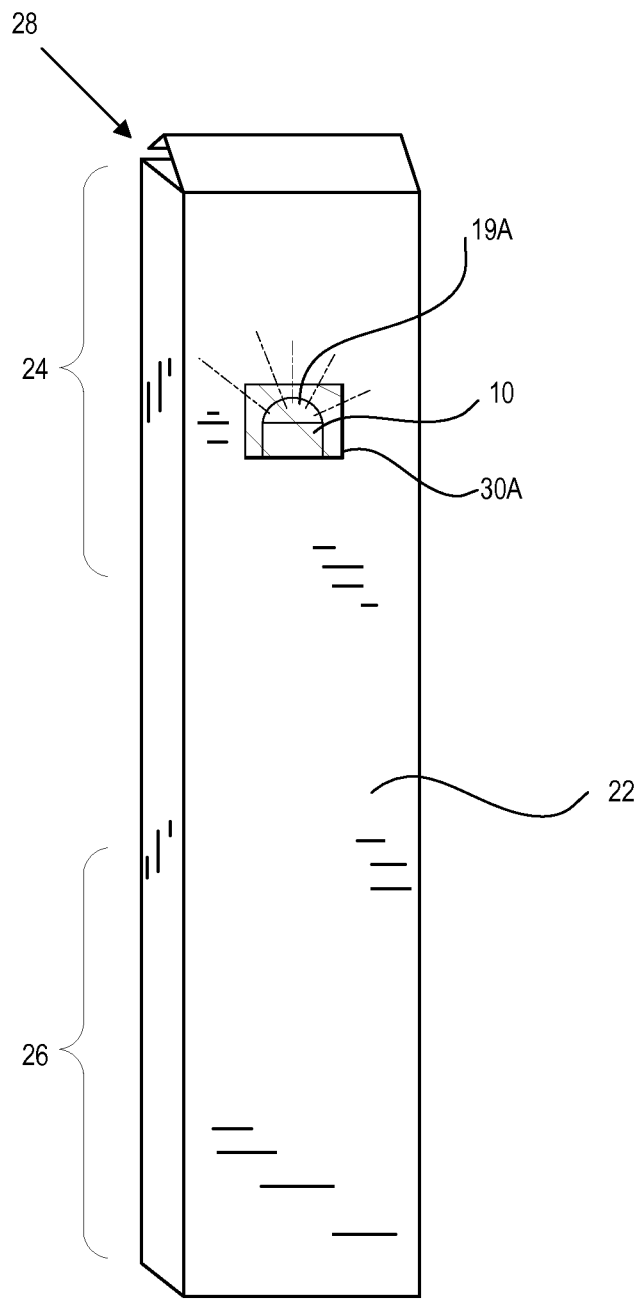
FIG. 3 is an isometric view depicting an example of a package for an eCig with a cut-out allowing light from eCig's LED tip to be emitted through the package.

FIG. 3 illustrates an example of a package 22 for a single eCig 10. The package 22 may be an elongated rectangular box in which a single eCig 10 can be placed. The package 22 may contain a top portion 24, a bottom portion 26, and an opening 28, similar to that shown in FIG. 30. In addition, the package 22 may include a window, translucent area, or cut-out portion 3A in or near the top portion 24 where the LED 19A of the eCig 10 would normally be positioned when the eCig 10 is in the package 22. The cut-out portion 30A may be rectangular, as shown in FIG. 3, or it may be circular, triangular, or any other shape. In alternative embodiments, the cut-out portion 30A (and/or LED 19A) may be located in or near the bottom portion 26 or elsewhere on the package 22. The cut-out portion 30A can allow light emitted by the LED 19A to shine through the package 22 and be seen even when the eCig 10 is completely enclosed within the package 22. This, in turn, can help market the eCig 10 in a retail setting.

Figure 4:
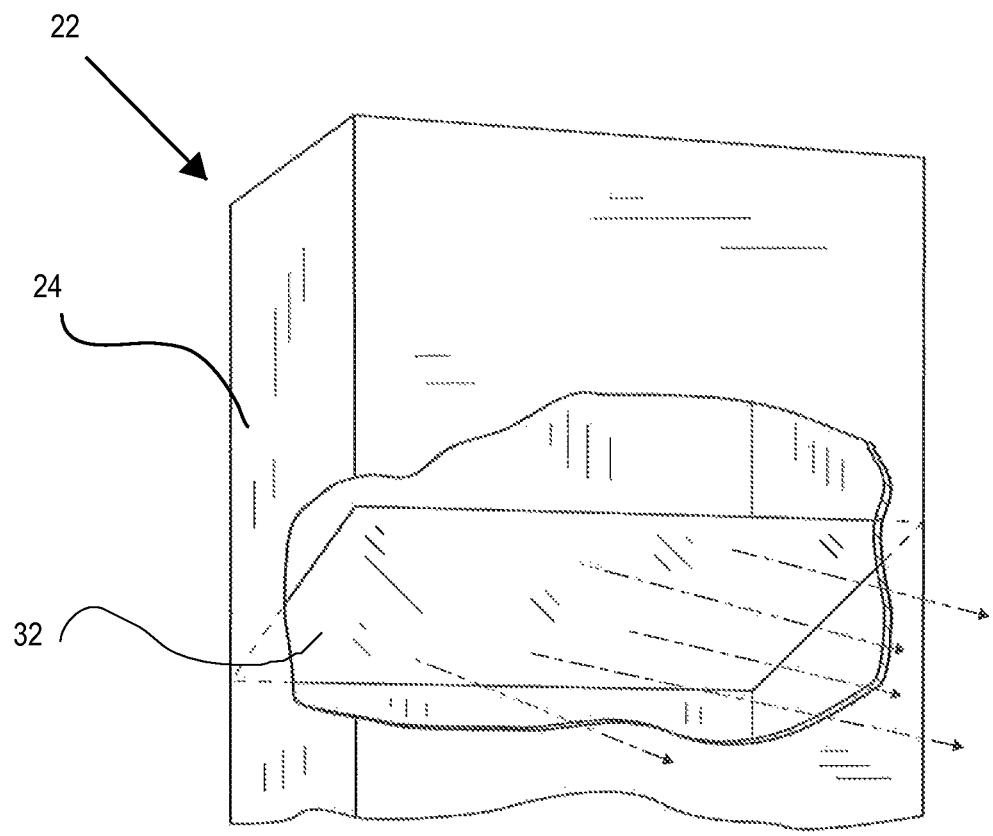
FIG. 4 is a cut-away view depicting an example of a portion of a package for an eCig with an angled mirror to reflect light emitted by the eCig's LED tip.

FIG. 4 is a cut-away view of the top portion 24 of package 22. In this embodiment, a reflective surface such as a sticker or a mirror 32 may be placed within the package 22. The mirror 32 may be positioned at an angle, such as a 45 degree angle for example, to a transverse plane (not shown) through package 22. The positioning of the mirror 32 can allow light from the eCig tip LED 19A (see FIGS. 1 and 3) to reflect off of the mirror 20 and through the cut-out portion 30A (see FIG. 3) of the packaging 22. In this way, the amount of light emitted through the cut-out portion 30A may be increased compared to the amount of light that would be emitted in a package without mirror 32. This may be beneficial for marketing and display of the package 22. The mirror 32 can also be configured to reflect light generated from the package 22 itself (e.g., an LED located anywhere in or on the package 22) or from external sources (e.g., an LED or other light source located in a sales fixture).

In an embodiment, the mirror 32 may be shaped (e.g., parabolic) and may be used to focus light emitted from the LED 19A. In another embodiment, the mirror 32 may be irregular in shape or faceted as to scatter light through the cut-out portion 30A. In yet another embodiment, a screen, film, or translucent material may be placed at the cut-out portion 30A to cause light emitted from LED 19A to diffuse or project as it exits the cut-out portion 30A.

Figure 5:
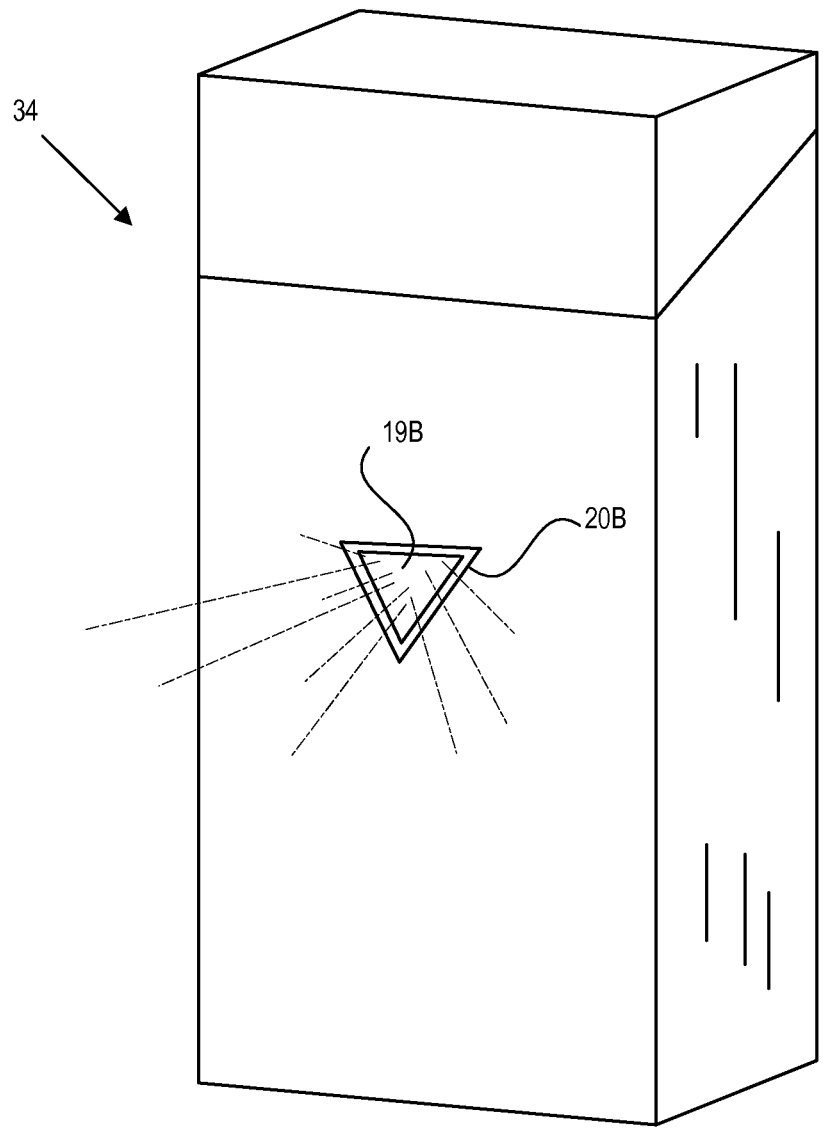
FIG. 5 is an isometric view depicting an example of a package for an eCig charging pack with a cut-out allowing light from the pack's LED logo to be emitted through package.

FIG. 5 illustrates an example of a package 34 for an eCig charging pack 20 (see FIG. 2). The package 34 may be a rectangular box similar in shape to the pack 20, but large enough to contain the pack 20. The package 34 may include a window, translucent area, or cut-out portion 30B in or near the area where LED 30B would normally be positioned when the pack 20 is placed in its package 34. In alternative embodiments, the cut-out portion 34 may be located in any other region of the package 34. The cut-out portion 34B may be triangular, as shown in FIG. 5, or it may be rectangular, circular, or any other shape. Light emitted by the LED 30B on the pack 20 can shine through cut-out portion 34B while the pack 20 is enclosed within its package 34. This, in turn, can help market pack 20 in a retail setting. Similar to the mirror 32 described above with respect to FIG. 4, a reflective surface (not shown) may also be placed anywhere within pack 20 to intensify, focus, or diffuse light emitted through cut-out portion 34B by LED 19B.

Figure 6:
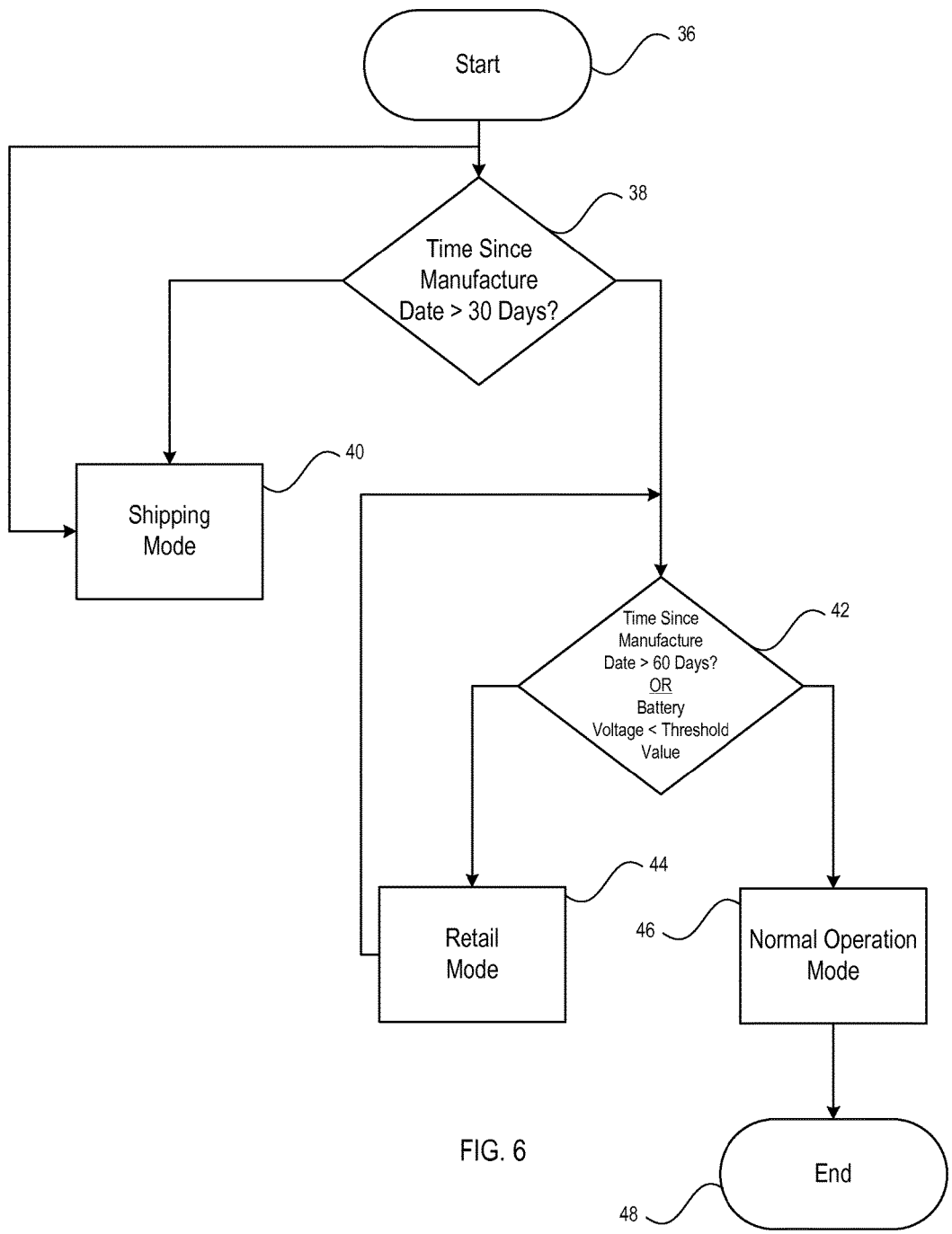
FIG. 6 is a flow chart depicting an example of a method for determining a mode of operation for an electronic smoking article.

FIG. 6 is a flow-chart illustrating an example of a method for determining a mode of operation for an eCig 10 or pack 20 with regard to their LEDs 19A and 19B, respectively (see FIGS. 1 and 2). In an embodiment, eCig 10 or pack 20 can operate in one of three different modes: a retail mode, a shipping mode, or a normal operating mode. It should be noted, however, that additional modes may exist without affecting the method or functionalities described herein.

In the retail mode, a MCU in eCig 10 or pack 20 can signal LED 19A or 19B, respectively, to periodically blink, glow, or emit light in a pattern. The blinking of LED 19A or 19B can be seen through cut-out portion 30A or 30B, respectively. Thus, a consumer in a retail setting can see an eCig 10 or pack 20 blinking through their respective packages (22 and 34). This blinking can create a glittery effect on a store counter, for example, or it can simply attract customers' attention. The timing of the blinking can be random, pseudo-random, or pre-determined.

In the shipping mode, a MCU in eCig 10 or pack 20 can cause LED 19A or 19B, respectively, to be inactive, such that the LEDs do not blink during the shipping mode. This allows the battery of the eCig 10 or pack 20 to be conserved while the product is being shipped.

In the normal operation mode, the MCU in eCig 10 can cause LED 19A to emit light only when a user inhales from the eCig 10, for example. In the normal operation mode for the pack 20, the pack's MCU can cause the LED 19B to emit light when the pack 20 is charging, for example. In other embodiments, the MCU may cause the pack LED 19B to emit light under other circumstances during the normal operation mode.

The method used by a MCU to determine whether LED 19A or 19B of the eCig 10 or pack 20, respectively, should operate in the retail, shipping, or normal operation mode begins at step 36 in FIG. 6. At step 38, the amount of time that has passed since the manufacture date of the smoking article is determined. In an embodiment, the MCU may include a timer, such as a count-down timer, that measures time since a smoking article's date of manufacture. If less than 30 days have passed since the date of manufacture, it is likely that the smoking article is in transit from the manufacturer to the retailer. In this case, the MCU can signal the LED to operate in the shipping mode at step 4. The method reverts back to step 38. If more than 30 days have elapsed since the manufacture of the smoking article, however, the process moves on to step 42, where it is determined whether more than 60 days have elapsed since manufacture, or alternatively, whether the smoking articles' battery voltage is less than a specified threshold value (the MCU can be communicatively linked to the battery in order to determine the battery voltage). If the answer to either of these queries is no, it is likely that the smoking article is displayed in a retail setting. In this case, the MCU can signal the LED to operate in the retail mode at step 44. The method reverts back to step 42. On the other hand, if more than 60 days have elapsed since manufacture, or if the battery voltage of the smoking article is less than the specified threshold value, it may be desirable to exit the retail mode in order to conserve energy for use of the eCig 10 or pack 20. In this case, the MCU can signal the LED to operate in the normal operation mode at step 46, and the method comes to an end at step 48.

Although the method above describes determining a mode of operation based on the amount of time that has elapsed since the manufacture date or the voltage level of the smoking device's battery, other variables can be used to determine the mode of operation. For example, an external trigger—such a removing a cap, being exposed to light, or receiving a wireless signal —may be detected by a sensor, such as a photodetector or motion sensor, for example, within the eCig 10 or pack 20. Detection of a threshold amount of this external trigger may cause the device to switch from shipping mode to retail mode or retail mode to normal operation mode, for example.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications, or modifications of the disclosure.

What is claimed is:

1. An electronic smoking article comprising
   a cartomizer configured to aerosolize a solution and deliver the aerosolized solution to a user;
   a battery configured to power the cartomizer;
   a light source configured to emit light from the electronic smoking article; and
   a microcontroller unit coupled to the light source, the microcontroller unit configured to control emission of light from the light source;
   wherein the microcontroller unit further comprises a timer configured to measure an amount of time that has passed since a date of manufacture of the electronic smoking article;
   wherein the microcontroller unit is further configured to operate in a retail mode when the amount of time that has passed since the date of manufacture of the electronic smoking article is greater than a first threshold value and less than or equal to a second threshold value; and wherein the light source is configured to emit light when the microcontroller unit is operating in the retail mode.

2. The electronic smoking article of claim 1, wherein the light source is further configured to emit light in a pattern when the microcontroller unit is operating in the retail mode.

3. The electronic smoking article of claim 1, wherein the microcontroller unit is further configured to operate in a shipping mode when the amount of time that has passed since the date of manufacture of the electronic smoking article is less than or equal to the first threshold value; and wherein the light source is configured to emit no light when the microcontroller unit is operating in the shipping mode.

4. The electronic smoking article of claim 1, wherein the microcontroller unit is further configured to operate in a normal operation mode when the amount of time that has passed since the date of manufacture of the electronic smoking article is greater than the second threshold value; and wherein, when the microcontroller unit is operating in the normal operation mode, the light source is configured to emit light in response to detected use or charging of the electronic smoking article.

5. The electronic smoking article of claim 4, wherein the microcontroller unit is further configured to operate in the retail mode when a voltage of the battery is greater than or equal to a third threshold value; and wherein microcontroller unit is further configured to operate in the normal operation mode when the voltage of the battery is less than the third threshold value.

6. The electronic smoking article of claim 1, wherein the first threshold value is 30 days.

7. The electronic smoking article of claim 1, wherein the second threshold value is 60 days.

8. A retail system for an electronic smoking article, the retail system comprising
   the electronic smoking article comprising
      i) a light source configured to emit light from the electronic smoking article, and
      ii) a microcontroller unit coupled to the light source, the microcontroller unit configured to control emission of light from the light source; and
   a package for the electronic smoking article, the package comprising a cut-out portion configured permit the light emitted from the light source to shine through the package when the electronic smoking article is enclosed within the package;
   wherein the microcontroller unit further comprises a timer configured to measure an amount of time that has passed since a date of manufacture of the electronic smoking article;
   wherein the microcontroller unit is further configured to operate in a retail mode when the amount of time that has passed since the date of manufacture of the electronic smoking article is greater than a first threshold value and less than or equal to a second threshold value; and wherein the light source is configured to emit patterned light when the microcontroller unit is operating in the retail mode.

9. The retail system of claim 8, wherein the light source comprises a LED.

10. The retail system of claim 8, wherein the microcontroller unit is further configured to operate in the retail mode when a voltage of a battery of the electronic smoking article is greater than or equal to a third threshold value; and wherein microcontroller unit is further configured to operate in the normal operation mode when the voltage of the battery is less than the third threshold value.

11. The retail system of claim 8, wherein the microcontroller unit is further configured to operate in a shipping mode when the amount of time that has passed since the date of manufacture of the electronic smoking article is less than or equal to the first threshold value; and wherein the light source is configured to emit no light when the microcontroller unit is operating in the shipping mode.

12. The retail system of claim 8, wherein the microcontroller unit is further configured to operate in a normal operation mode when the amount of time that has passed since the date of manufacture of the electronic smoking article is greater than the second threshold value; and wherein, when the microcontroller unit is operating in the normal operation mode, the light source is configured to emit light in response to detected use or charging of the electronic smoking article.

13. The retail system of claim 8, wherein the first threshold value is 30 days.

14. The retail system of claim 8, wherein the second threshold value is 60 days.

15. The retail system of claim 8, wherein the cut-out portion of the package is configured to permit light emitted by the light source to be visible to consumers when the package is placed in a back bar display.

16. The retail system of claim 8, wherein the package comprises cardboard.

17. The retail system of claim 8, wherein the cut-out portion of the package comprises a transparent or translucent window.

18. The retail system of claim 8, wherein the package further comprises a reflective surface configured to reflect the light emitted from the light source through the cut-out portion.

19. The retail system of claim 18, wherein the reflective surface is further configured to focus the light emitted from the light source through the cut-out portion.

20. The retail system of claim 18, wherein the reflective surface is further configured to scatter the light emitted from the light source through the cut-out portion.

21. The retail system of claim 18, wherein the reflective surface is further configured to diffuse or project the light emitted from the light source through the cut-out portion.

22. The retail system of claim 8, wherein the microcontroller unit further comprises a sensor configured to detect an external trigger; and wherein the microcontroller unit is configured to operate in a retail mode when the external trigger has been detected.

23. The retail system of claim 22, wherein the sensor is a photodetector and wherein the external trigger is light.

24. The retail system of claim 22, wherein the sensor is a motion sensor.

* * * * *